July 22, 1969  W. E. DOERING ET AL  3,457,095

METHOD OF FABRICATING TRANSPARENT REINFORCED GLASS PIPE

Original Filed Aug. 5, 1963

INVENTORS
WILLIAM E. DOERING
ROBERT R. KEGG
BY
ATTORNEYS

United States Patent Office 3,457,095
Patented July 22, 1969

3,457,095
METHOD OF FABRICATING TRANSPARENT REINFORCED GLASS PIPE
William E. Doering and Robert R. Kegg, Toledo, Ohio, assignors to Owens-Illinois, Inc., a corporation of Ohio
Original application Aug. 5, 1963, Ser. No. 299,933, now Patent No. 3,314,450, dated Apr. 18, 1967. Divided and this application Apr. 13, 1966, Ser. No. 560,913
Int. Cl. B44d 1/16
U.S. Cl. 117—5.5                  15 Claims

ABSTRACT OF THE DISCLOSURE

This invention relates to the method of fabricating a transparent reinforced glass pipe. A layer of synthetic resin material and glass fibers is first applied to the glass tube. A second layer of synthetic resin material is then applied over the first layer. Polyvinyl acetate is applied as a finish coating over the first two layers forming the composite transparent reinforced pipe.

---

The subject application is a divisional application of an earlier-filed application Ser. No. 299,933, filed Aug. 5, 1963, and issued as Patent No. 3,314,450 on Apr. 18, 1967. The application with Ser. No. 299,933 was a continuation-in-part of an earlier-filed application Ser. No. 263,915, filed Mar. 8, 1963, having the same title, and now abandoned.

This invention relates to glass pipe and more specifically to transparent reinforced glass pipe and fittings which are strengthened and protected against damage due to mechanical, physical and thermal shock.

Reinforced glass pipe and fittings have found greater acceptance and more widespread use in recent years and are commonly referred to as armored glass pipe. Since glass is known to be an ideal material for transporting fluids which attack or are discolored or contaminated by conventional metal or plastic pipe, the transparency, non-corrosive nature and smoothness of glass pipe provide properties of particular utility in conveying fluids. However, unprotected glass pipe even when tempered has been found to be subject to abuse while in certain forms of service, and its primary application has been where it is exposed to view and its frangible character can be appreciated.

Heretofore, armored glass pipe has normally been fabricated of woven cloth or sleeve-like fibrous material which surrounds the exterior surfaces of the pipe section and is bonded thereto by an integral coating of plastic material filling the interstices of the fibrous material. In such product the light-transmission characteristics can at best be described as translucent and the pipe is completely lacking in adequate transparency or clearness to permit full observation and examination of internal surfaces and conveyed fluids. The present invention obviates the disadvantages of prior art constructions and provides fully transparent glass pipe having substantial impact resistance.

Accordingly, the present invention relates to a highly-transparent reinforced glass pipe having coated rupture-resistant exterior surfaces and to a method of producing such product having light-transmission and clarity.

Another object of this invention is the manufacture of fibrous reinforced glass piping which is structurally strong and having considerable lucidity.

Another object of this invention is the manufacture of reinforced glass pipe and fittings having outer surfaces consisting of optically-matched polymerized unsaturated polyester resin and glass fibers integrally bonded to the glass surfaces.

Another object of this invention is to provide a composite strengthened fully transparent tubular glass product having at least two exterior coatings of reacted synthetic resin containing material with an intermediate layer additionally containing a minor amount of relatively short-length optically matched fibers.

An additional object of this invention is to provide a method of fabricating strengthened glass pipe having improved light-transmission characteristics and of accomplishing such improved characteristics in a manner such that the exterior surfaces of the glass pipe are covered with at least two integrally-bonded transparent layers of thermoset synthetic resin containing material, and in such manner that the intermediate layer of thermoset synthetic resin containing material contains relatively short-length glass fibers fully embedded therein, and in such further manner that the named materials comprising the several layers possess indices of refraction complemental to the parent glass pipe.

The specific nature of this invention, as well as other objects and advantages thereof, will become apparent to those skilled in the art from the following description taken in conjunction with the annexed sheet of drawings on which, by way of preferred example only, is illustrated the preferred embodiments of this invention.

In the drawings, wherein like numerals are employed to designate like parts throughout the same:

Figure 1:
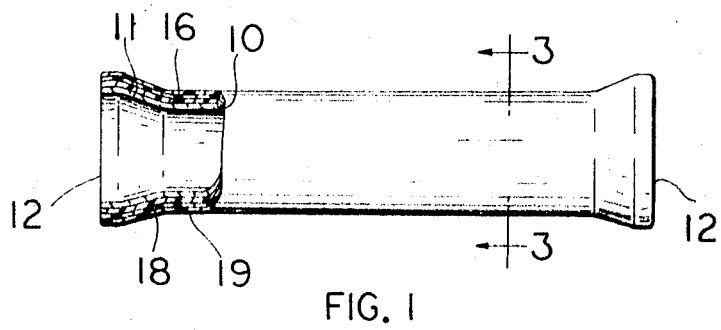
FIG. 1 is a side view partly in vertical section of a pipe section fabricated in accordance with the present invention.
Figure 2:
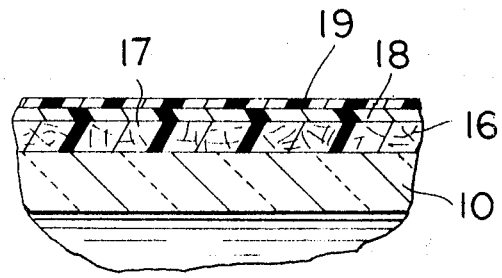
FIG. 2 is an enlarged fragmentary vertical sectional view of a sidewall portion of the pipe section shown in FIG. 1.
Figure 3:
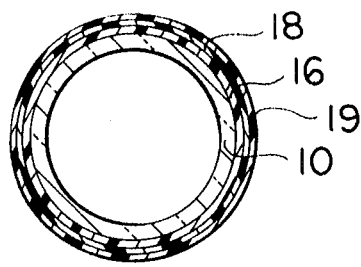
FIG. 3 is a vertical sectional view of the pipe section taken along the line 3—3 of FIG. 1.
Figure 4:
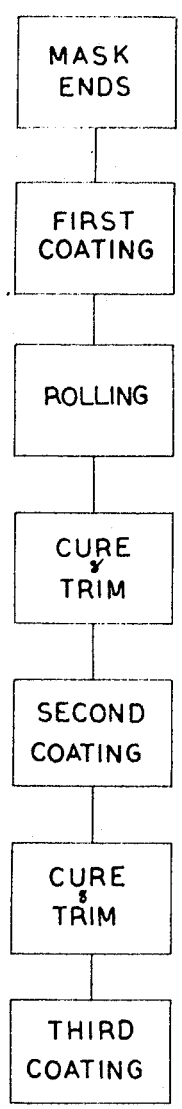
FIG. 4 is a schematic diagram of a process for fabricating the pipe section in accordance with our invention.

Referring to the drawing, a glass tube 10 having a basically cylindrical shape with outwardly flared thickened flange portions 11 at opposite ends is provided for subsequent reinforcement. The flange portions 11 at opposite ends of the tube 10 taper exteriorly to form an inclined shoulder which terminates in a transverse sealing surface 12 normally having a greater width than the tube sidewall thickness. Sealing surface 12 is preferably planar and provided with an annular groove (not shown) to facilitate the seating of an annular gasket member frequently utilized in sealing together juxtaposed ends of similarly-flanged glass pipe sections and glass fittings. Alternately, sealing surface 12 may be substantially planar or convexly-curved as known in the art.

Tube 10 is generally comprised of borosilicate glass such as Kimble Glass No. KG–33 which will operate at temperatures up to 450° F. or higher and is tempered to provide heat shock resistance. The glass may be either tempered to impart substantial mechanical strength and resistance to impact damage or annealed to relieve stresses therein. Glass tube 10 may be fabricated of clear transparent glass of widely varying composition, although borosilicate glass is known to be of particular utility in the form of glass pipe for use in the food, beverage and chemical processing industries as well as laboratory and research facilities. One form of glass tube is the referenced KG–33 borosilicate glass having an index of refraction of 1.47, density of 2.23 grams per cc., a coefficient of thermal expansion (0–300° C.) of $32 \times 10^{-7}$ ° C. and a chemical durability factor of 0.26 ml. of N/50 $H_2SO_4$, USP XVI.

Straight pipe section 10 is taken for reinforcement by mounting a support plug in each end with both plugs being mounted on a coaxially disposed rod or shaft for rotation. Sealing surfaces 12 at each end are protected as by the application of a thin layer of paraffin wax or pressure-sensitive masking tape. No pretreatment of the pipe exterior surfaces is required, although, depending upon the selection of coating materials, a primer may be applied as required or desired.

The first coating or layer of reinforcement material designated by the numeral 16 consists of a synthetic thermosetting resin such as prepolymerized unsaturated polyester resin monomers and chopped glass fibers which are applied over the tube exterior surfaces extending fully coextensively therewith.

The glass fibers may vary from about 0.5 to 1.0 inch in length and preferably have an average length of about 0.75 inch with a diameter up to about 0.001 inch. Glass fibers comprised of Owens-Corning Fiberglas Corp. "E" glass and having an index of refraction of about 1.549 (at 550 millimicrons and 32° C.) and transparent clarity are preferred. "E" glass is a borosilicate glass composition ranging from about 52–56% silicon dioxide, 16–25% calcium oxide, 12–16% aluminum oxide, 8–13% boron oxide, 0–1% sodium and potassium oxides and 0–6% magnesium oxide. Filaments obtained in the form of continuous roving, and particularly Owens-Corning Fiberglas Corp. Product No. 851 fine strand having a chromesilane sizing, are preferred. The fibers may also have a No. 114, Volan or Volan A finish, as described on page 41 of the publication, "Textile Fiber Materials for Industry," published by Owens-Corning Fiberglas Corp., dated June 1961. Volan is a trade name for a Werner-type chromium complex (methacrylatochromatic chloride) in isopropanol and is utilized as a bonding agent applied to glass fibers to improve the adhesion between glass and resin. The aforesaid finishes on the fibers provide excellent wet-out of the plastic resins during various laminating processes.

A preferred composition useful in the present invention consists essentially of a thermosetting resinous material such as crystal clear linear polyester resin used for casting and encapsulating purposes. The first-applied layer or coating includes 10 to 30 percent, and preferably from 17 to 20 percent, based on the weight of the composition, of short pieces of glass fibers substantially uniformly dispersed throughout the solid thermoset material.

A clear thermoset resin found to have properties of particular value for use in the present invention consists of Product No. 1960A, an unsaturated polyester resin manufactured and distributed by the Finishes Division of Interchemical Corp., Cincinnati, Ohio. This product is a crystal clear polyester resin containing 72% solids and 28% styrene, having a viscosity of 3100 to 3800 centipoises at 26° C., and is basically comprised of the monomer styrene having a weight of 9.6 pounds per gallon. This product has a refractive index of 1.540, excellent optical properties and good clarity. This product is comparable to Product No. 1360 of Interchemical Corp., a polyester casting resin described in its Bulletin No. 12–1 published in February 1962. Other polyester resins containing up to 35% styrene and having refractive indices such as 1.5410 before cure and 1.5560 after cure, for example, are also utilizable in the present invention.

The selected unsaturated polyester resin is diluted with styrene monomer in one embodiment of the invention in order to obtain better spraying characteristics. A 10 percent by weight addition of styrene is preferred. An accelerator or promoter such as 6% cobalt naphthenate is added to the styrene diluted resin. This general purpose accelerator is used with a methyl-ethyl-ketone peroxide catalyst to give a fast cure to the polyester resin at room temperature. The accelerator is added in the amount of up to .70% by weight of accelerator to the diluted resin. The resin with the styrene and accelerator additions is introduced into a spray gun from a pressurized tank.

A flexibilizer or flexible polyester resin, such as Product No. 1612 distributed by Interchemical Corp., is added to the stated formulation in an amount ranging from 15 to 50%, by weight, to provide a more flexible resin system capable of withstanding severe temperature changes as low as −20° F. without stress-cracking due to thermal effects. A preferred addition consists of 25 percent by weight flexibilizer having a very low unsaturated acid content and rather high styrene dilution to develop optimum tensile strength in the polymerized resin.

The catalyst consists of 60% methyl-ethyl-ketone peroxide in dimethyl phthalate. This product consists of one part methyl-ethyl-ketone peroxide to two parts diallyl phthalate to increase the volume to provide more accurate metering. The diluted catalyst is fed to the spray gun from a separate pressurized tank and about 3.0% catalyst is utilized based on the weight of resin.

Unsaturated polyesters are linear polyester resins based on dibasic acids and dihydric alcohols capable of crosslinking with vinyl monomers such as styrene to form thermoset copolymers.

The monomer component of the polyester resin reacts with the unsaturated groups in the polyester chains to form a cross-linked, thermoset polymer. Converting the polyester resins from the liquid to the solid state involves a copolymerization or addition reaction wherein no volatile byproducts are released. The catalyst decomposes into highly active free radicals which serve to promote free-radical type reactions and attendant polymerization throughout the entire mass of material. Thus, the free radicals to which the catalyst decomposes become a part of the polymer network and, therefore, the catalyst is not recovered as in the case of a true catalyst. The addition polymerization is promoted by initiators such as peroxides. Inhibitors are generally included to provide storage stability and to control the polymerization reactions.

As stated above, glass tube 10 mounted on a rotatable shaft with its ends plugged and masked is positioned in a spray booth preferably in horizontal relation. Diluted resin and accelerator are retained in a first pressurized tank at a pressure of about 40 to 50 p.s.i. gauge while the catalyst is maintained in a second pressurized tank at a pressure of about 30 p.s.i. gauge. The continuous glass fiber roving is fed into one side of a multiple-orifice spray gun while the resin system and catalyst are fed into another orifice of the same spray gun. Examples of spraying apparatus and methods of delivering the resin system and glass fibers onto the workpiece are disclosed in U.S. Patent Nos. 2,787,314 and 2,933,125 to Anderson, issued Apr. 2, 1957, and Apr. 19, 1960, respectively. Such apparatus is capable of cutting glass fiber roving into short lengths while separating the constituent ends of each cut section from each other and coating the cut fibers with the plastic bonding material during its delivery onto a workpiece. The combined fibers and plastic material are delivered onto the exterior surfaces of pipe section 10 during its axial rotation to form a continuous layer 16 starting at one end and proceeding at a uniform rate to the other end. The applied material exhibits a feathery appearance as deposited exteriorly from the deposited material. Mixing of the resin, catalyst and chopped fiber takes place externally of the gun between its several orifices and the rotating pipe. Total material delivered by the gun onto the pipe surfaces is approximately two pounds per minute, for example, which amount is slightly increased or decreased for coating different pipe diameters. Also the speed of rotation of the pipe is varied for different pipe diameters to obtain substantially the same coating thickness of the various sizes. Typical rotational speeds for various pipe internal diameters include the following: 1 inch diameter, 120 r.p.m.; 3 inch diameter, 50 r.p.m.; and 6 inch diameter, 30 r.p.m.

A rotatable cylindrical roll such as a mohair paint roller or a serrated metallic roller dipped in styrene monomer is immediately applied to the first layer or coating 16 with slight pressure to force the tangentially projecting cut fibers into contact with the deposited plastic material. All exterior surfaces of the article which are completely coated between the masked transverse sealing surfaces 12 are similarly rolled. Utilizing the monomer styrene on the roller prevents the deformable resin and fibers from being pulled from the pipe surfaces. The synthetic resin and cut fibers 17 are evenly distributed over the exterior surfaces and uniform pressure is applied to the roller to force the feathery projecting portions of the fibers into full contact with the adhered resin. The first layer 16 is thus applied having a thickness ranging from about 1/32 to 1/4 inch depending upon the particular external dimension and wall thickness of the pipe section. The section is preferably continually rotated during initial stages of curing for a period of about 10–15 minutes to maintain a uniform coating thickness until gelation of the resin system is complete.

The coated section is cured either in air or by the application of heat and during an intermediate portion of the curing period, the end surfaces of the pipe section are annularly trimmed to eliminate the coating therefrom. A knife edge is utilized to sever excess end portions of the first coating 16 from projecting beyond sealing surfaces 12. First coating 16 is cured over a period ranging from 30 minutes to several hours following which time the resin system becomes solidified and hardened with only slight residual tackiness.

Following curing of the first coating, a second coating 18 of the same thermoset polyester resin is applied. Second coating 18 consists of the resin only without the introduction of glass fibers and has a substantially lesser thickness than coating 16. The second coating may have a thickness ranging up to about 1/8 inch, or preferably, less than about one-half the thickness of the first coating. The second coating serves to embed fully all exteriorly projecting portions of glass fibers and to submerge the same within the resin system. A different type of spray gun from those disclosed in the named patents and capable of atomizing the resin into minute particles or droplets is preferred for the second coating 18 in order to obtain a smooth uniform exterior surface. The second coating is preferably applied at the rate of about one-third pound per minute. The pipe section is continually rotated as described above during the application of second coating 18 and during preliminary stages of its gelation. The rotation during gelation maintains the flowable thermoset resin in the form of a uniform layer and prevents gravitational effects from causing the resin to flow downwardly into locally thickened areas. When the resin system has been at least partially polymerized and cured, the end surfaces of the pipe section are again annularly trimmed as by a knife edge to eliminate axially projecting end portions. The trimmed portions consist of material which extends axially beyond end surfaces 12.

After preliminary curing for a relatively brief period of about 30 minutes, a third and finishing coating 19 is applied over second coating 18 extending fully coextensively therewith. Exterior coating 19 consists of polyvinyl acetate which is applied as a thin film over polyester resin layer 18 to eliminate its inherent tackiness in use. A solution containing about 10% polyvinyl acetate and about 90% ethanol by weight is prepared and sprayed over coating 18 during continuous rotation of the pipe section. The ethanol serves as a carrier for the polyvinyl acetate to facilitate its application. Coating 19 is applied at ambient temperature and provides a covering film to maintain polyester resin coating 18 free from atmospheric effects.

Air and moisture in combination with adverse thermal conditions result in their reaction with the polyester resin, when unprotected, causing the combined coating to exhibit physical properties of being sticky or tacky. Such condition causes the plastic coating to be tacky to touch and results in the adherence of dirt particles. The overcoat 19 of polyvinyl acetate eliminates tackiness of the multilayer coating and provides good optical clarity. The thickness of coating 19 is varied as desired or required, however, a minimum thickness of about .005 to .010 inch is preferred. Good optical properties through the combined coating with no appreciable change in the clarity or light transmission is obtained. While the polyester coating 18 can be cured in long periods of time without coating 19, the latter is applied to minimize curing time and provide permanently tack-free surfaces.

Polyvinyl acetate is a colorless, transparent synthetic resin derived from polymerization of vinyl acetate with peroxide catalysts and provides a protective film over the subject polyester resin and glass fibers. Polyvinyl acetate has a refractive index ranging from 1.52 to 1.55 which compares favorably with the R.I. values of the polyester resin of 1.540 and the glass fibers of 1.549.

The reinforced pipe section consists of a multilayered plastic coating integrally bonded to and fully contiguous with the exterior surfaces of the pipe section. It will be readily appreciated how the second and third layers serve to give transparency to the first coating. Embedding the optically-matched glass fibers within the resin system serves to virtually eliminate their individual identity and perception within the reinforcing layers. With the reinforcing layers properly applied, very few of the fibers are capable of observation and the interior surfaces of the pipe section are readily observable. Where the several coatings have a combined thickness ranging from about 1/32 to 3/8 inch and are applied in accordance with the foregoing description, both conveyed fluids and internal surfaces of the pipe section are clearly visible due to the clearness and transparency of the reinforcing layers. In the above-described embodiment of the present invention, the composite single sidewall of the reinforced pipe section has an index of refraction of about $1.495 \pm .005$ for a glass thickness of 0.125 inch and a coating thickness of 0.042 inch.

Optically matching the transparent components of the exterior protective layers to the parent glass provides economical reinforcement of the latter without loss of optical resolution. In the event of failure of the reinforced pipe section in service, the coating serves to retain glass fragments together with a minimum loss of the contents within the pipe section until the line can be shut off and drained, and the section replaced.

The reinforcing coating serves to protect the glass pipe section against accidental breakage due to physical or thermal shock. The coating cushions the force of physical impacts delivered to exterior surfaces and moderates the effect of thermally-induced stresses between interior and exterior surfaces of the gas pipe. The surface of the glass is thus exteriorly protected to avoid the formation of flaws or surface defects while in service. The combined glass fiber-plastic coating provides an armoring capable of withstanding severe and repeated thermal and physical shock with high transparency.

We claim:

1. The method of making a transparent reinforced pipe section comprising the steps of adhering a first layer of thermosetting synthetic resin material and glass fibers over the exterior wall surfaces of a transparent glass tube, curing said first layer to cause it to harden and solidify, adhering a second layer of thermosetting synthetic resin material over said first layer to envelop and embed fully the glass fiber component thereof, curing said second layer to cause it to harden and solidify, said thermosetting synthetic resin material and glass fibers being transparent and having indices of refraction complemental to said transparent glass tube to provide reinforcement and improved light transmission therethrough.

2. The method in accordance with claim 1 including the step of smoothing the exterior surface of said first layer with pressure while in deformable condition prior to the application of said second layer.

3. The method in accordance with claim 1 including the step of applying said second layer having sufficient thickness to embed fully the glass fiber component of said first layer.

4. The method in accordance with claim 1 including the steps of rotating said glass tube during the application of said layer, the latter having a substantially greater thickness than said second layer.

5. The method in accordance with claim 1 including the steps of applying a transparent polyester resin containing material as a primary constituent of both layers to a tempered borosilicate glass tube, and applying a third layer containing polyvinyl acetate as a protective tack-free solidified film over said first and second layer.

6. The method in accordance with claim 5, including the further steps of: controlling the thickness of said first layer on said glass tube to a thickness ranging from about 1/32 to 1/4 inch; controlling the thickness of said second layer on said first layer to a thickness less than about one-half the thickness of said first layer; controlling the thickness of said third layer to a thickness of about 0.005 to 0.10 inch; and controlling the combined thicknesses of said first layer, said second layer and said third layer to a thickness not in excess of about 3/8 inch.

7. The method of fabricating a transparent reinforced pipe section comprising the steps of masking the transverse end surfaces of a tempered borosilicate glass tube, rotating said glass tube about its axis, applying a first adherent uniform layer of transparent polyester resin containing material and relatively short-length glass fibers over essentially all exterior surfaces of said glass tube between its masked end surfaces during said rotation, curing said first layer causing it to harden and solidify, applying a second layer of polyester resin containing material over said first layer to envelop and embed fully the glass fiber component thereof during further rotation, curing said second layer causing it to harden and solidify, applying a third layer of polyvinyl acetate containing material over said second layer during further rotation, said polyester resin, said polyvinyl acetate, and said glass fibers having indices of refraction closely complemental to said borosilicate glass tube for improved light transmission therethrough.

8. A method of fabricating a transparent reinforced pipe section comprising the steps of selecting a transparent glass tube, thermosetting synthetic resin material and glass fibers possessing mutually complemental indices of refraction, preparing a composite coating of said synthetic resin material and said glass fibers, applying said composite coating as a first layer over the exterior surfaces of said glass tube, curing said first layer to cause it to harden and solidify, enveloping the glass fiber component of said first layer within a second layer of thermosetting synthetic resin material possessing properties of adhering to said first layer, curing said second layer to cause it to harden and solidify thereby providing a resultant transparent reinforced pipe section.

9. A method according to claim 8, including applying said composite as a continuous layer extending coextensively over the exterior surfaces of said glass tube.

10. A method according to claim 8, including controlling the thickness of said first layer on said glass tube to a thickness ranging from about 1/32 to 1/4 inch.

11. A method according to claim 10, including controlling the thickness of said second layer to a thickness not in excess of about 1/8 inch.

12. A method according to claim 8, including controlling the thickness of said second layer on said first layer to a thickness less than about one-half the thickness of said first layer.

13. A method according to claim 8, including applying said composite to said glass tube in a flowable condition.

14. A method according to claim 13, including smoothing the exposed surfaces of said first layer prior to enveloping said glass fiber constituent within said second layer.

15. A method according to claim 13, including the step of rotating said glass tube together with said first layer thereon while said composite is in a flowable condition, said rotating step being such that the rate of rotational motion of said glass tube is sufficient to distribute said first layer uniformly on said glass tube.

References Cited

UNITED STATES PATENTS

| | | | |
|---|---|---|---|
| 2,040,876 | 5/1936 | Postlewaite | 117—94 |
| 2,311,613 | 2/1943 | Slayter. | |
| 2,583,024 | 1/1952 | Strobel | 117—64 |
| 2,606,574 | 8/1952 | Lefebvre | 156—294 X |
| 2,787,555 | 4/1957 | Drummond. | |
| 3,131,077 | 4/1964 | Barnby et al. | 117—72 X |
| 3,241,518 | 3/1966 | Johnson | 117—5.5 X |
| 3,271,182 | 9/1966 | Varlet. | |

WILLIAM D. MARTIN, Primary Examiner

R. HUSACK, Assistant Examiner

U.S. Cl. X.R.

117—64, 72, 94, 105.4, 124

UNITED STATES PATENT OFFICE
CERTIFICATE OF CORRECTION

Patent No. 3,457,095                          July 22, 1969

William E. Doering et al.

It is certified that error appears in the above identified patent and that said Letters Patent are hereby corrected as shown below:

Column 4, line 40, "50" should read -- 45 --. Column 7, line 7, insert -- first -- between the words "said" and "layer" line 22, "0.10" should read -- 0.010 --.

Signed and sealed this 30th day of December 1969.

(SEAL)
Attest:

Edward M. Fletcher, Jr.                       WILLIAM E. SCHUYLER, JR.
Attesting Officer                                Commissioner of Patents